United States Patent
Power et al.

(10) Patent No.: US 9,086,967 B2
(45) Date of Patent: *Jul. 21, 2015

(54) METHOD AND SYSTEM TO DISTRIBUTE FAULT INFORMATION IN A LARGE SCALE COMMUNICATION NETWORK SYSTEM COMPRISING HIERARCHICAL MANAGEMENT NODES

(71) Applicant: TELEFONAKTIEBOLAGET L M ERICSSON (PUBL), Stockholm (SE)

(72) Inventors: John Power, Kilmacthomas (IE); Edwin Tse, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/073,129

(22) Filed: Nov. 6, 2013

(65) Prior Publication Data

US 2014/0136906 A1   May 15, 2014

Related U.S. Application Data

(63) Continuation of application No. 13/141,925, filed as application No. PCT/SE2009/050702 on Jun. 10, 2009, now Pat. No. 8,601,117.

(60) Provisional application No. 61/140,414, filed on Dec. 23, 2008.

(51) Int. Cl.
*G06F 11/07* (2006.01)
*H04L 12/24* (2006.01)

(52) U.S. Cl.
CPC .......... *G06F 11/0784* (2013.01); *H04L 41/044* (2013.01); *H04L 41/0604* (2013.01); *H04L 41/0627* (2013.01); *H04L 41/0686* (2013.01)

(58) Field of Classification Search
CPC .............. H04L 41/044; H04L 41/06–41/0627; H04L 43/00–43/067; H04L 43/0823–43/087; G06F 11/0784
USPC ......................................................... 709/224
See application file for complete search history.

(56) References Cited

U.S. PATENT DOCUMENTS 6,112,015 A * 8/2000 Planas et al. .................. 709/223
6,665,262 B1 * 12/2003 Lindskog et al. ............. 370/216

(Continued)

FOREIGN PATENT DOCUMENTS

EP   1 785 866 A    5/2007
EP   1785866 A1 *  5/2007   .............. G06F 11/07

(Continued)

OTHER PUBLICATIONS

"Digital cellular telecommunications system (Phase 2+); Universal Mobile Telecommunications System (UMTS); Telecommunication management; Fault Management; Part 2: Alarm Integration Reference Point (IRP): Information Service (IS) (3GPP TS 32.111-2 version 7.1.0 Release 7); ETSI TS 132 111-2" ETSI Standards, LIS, Sophia Antipolis Cedex, France, vol. 3-SA5, No. V7.1.0, Mar. 1, 2007, XP014038258, ISSN: 0000-0001, figures 1,2, p. 28, line 19-p. 30, line 20 p. 33, line 19-p. 34, line 36,pp. 40-41.

(Continued)

*Primary Examiner* — Lance L Barry (57) ABSTRACT

The present invention relates to a method and an arrangement for distributing fault information among hierarchical management nodes. Specifically, the method involves distributing fault information from a lower level network management node to a higher level network management node in a network management architecture comprising modules logically representing network nodes and network links under management. The higher level network management node subscribes to at least some detailed fault information. And, a notification comprising a summary of fault information sent by the lower level network management node is received by the higher level network management node. Then, the higher level network management node retrieves the subscribed detailed fault information from said received notification.

14 Claims, 5 Drawing Sheets

(56) References Cited

U.S. PATENT DOCUMENTS

| | | | |
|---|---|---|---|
| 7,111,241 B2 * | 9/2006 | Takats | 715/736 |
| 7,185,061 B1 * | 2/2007 | Gopal et al. | 709/207 |
| 7,197,559 B2 * | 3/2007 | Goldstein et al. | 709/224 |
| 7,486,623 B2 * | 2/2009 | Sills | 370/241 |
| 7,693,810 B2 * | 4/2010 | Donoho et al. | 706/48 |
| 8,601,117 B2 * | 12/2013 | Power et al. | 709/224 |
| 2002/0055790 A1 | 5/2002 | Havekost | |
| 2006/0020686 A1 | 1/2006 | Liss | |
| 2007/0143473 A1 * | 6/2007 | Wada | 709/224 |
| 2010/0154059 A1 * | 6/2010 | McNamee et al. | 726/23 |

FOREIGN PATENT DOCUMENTS

| | | |
|---|---|---|
| JP | 2000-244510 A | 9/2000 |
| JP | 2002-368745 A | 12/2002 |
| WO | WO 2004/074954 A2 | 9/2004 |
| WO | WO 2008/050059 A | 5/2008 |

OTHER PUBLICATIONS

ETSI TS 132 302, v7.0.0, pp. 5-9 and 16-18 [online] Jun. 2007, ETSI. Retrieved from the internet: http://www.etsi.org/deliver.etsi)ts/132300_132302/07.00.00_60/ts_132302v070000.pdf.

3GPP. 3rd Generation Partnership Project; Technical Specification Group Services and System Aspects; Telecommunication management; Configuration Management (CM); Notification Integration Reference Point (IRP): Information Service (IS) (Release 7). 3GPP TS 32.302 v7.0.0 (Jun. 2007).

* cited by examiner

METHOD AND SYSTEM TO DISTRIBUTE FAULT INFORMATION IN A LARGE SCALE COMMUNICATION NETWORK SYSTEM COMPRISING HIERARCHICAL MANAGEMENT NODES

RELATED APPLICATIONS

This application is a continuation of U.S. patent application Ser. No. 13/141,925 filed on Jun. 23, 2011, now issued as U.S. Pat. No. 8,601,117, which is a 371 of PCT/SE2009/050702, filed Jun. 10, 2009, which claims the priority benefit under 35 U.S.C. §119(e) of U.S. Provisional Application No. 61/140,414, filed Dec. 23, 2008, the disclosures of which are incorporated herein by reference in their entireties.

FIELD OF THE INVENTION

The present invention relates to a method and arrangement in a communication network system, in particular to an arrangement allowing for distributing fault information as well as a method for such distribution.

BACKGROUND

A system and method for counting events of plurality of managed network elements (NEs) in a large communication network may be summarized as below.

Network events are collected by event collectors (ECs) from event reporters (ERs). An EC then partitions the events into clusters based on partition criteria. The EC counts the number of events in each cluster and reports the outcome based on a so called report notification trigger criteria. Receivers of the reports may query the EC for the details of the events, if it is in their interest to do so.

A communication network consists of nodes and links. These are subject to network management and are called network elements (NEs) in this context. A large communication network consists of thousands of such NEs for the purpose of transporting information among users/subscribers of the network. These NEs may have faults and the faults are reported as alarms. In the context of this application, these NEs having alarm condition are termed event reporters (ERs).

An alarm notification carries many information parameters. For example, it carries the identity of the NE in alarmed state, the severity of the alarm, the probable cause of the alarm, the time of the alarm condition, the suggested remedy action, etc. In 3GPP/3GPP2, the alarm notification contains some 20 parameters.

In a communication network, there are nodes or systems that are not responsible for transporting information for user/subscribers of the network. These nodes or systems, e.g. an element manager (EM) and DM of FIG. 2, manage the network. They install, configure and supervise the nodes and links. They monitor the network and if the network performance falls below some planned threshold, the network managers then initiate a recovery plan involving, for example, reconfiguring the nodes, reconfigure user call routes, deactivate faulty nodes and activate backup nodes etc. In the context of this paper, these nodes are termed event collectors (ECs).

The network management architecture, i.e. organization of the DMs and NEs, and the distribution of network management functionalities among them, protocols and network management services, e.g. fault management services, configuration management services such as the FCAPS network management services defined by ITU-T, are subject of various international standardization bodies and organizations such as ITU-T, 3GPP, 3GPP2 and IETF. All these network management architectures have one basic principle in that the entities are organized in a hierarchy as shown in FIG. 2.

Figure 2:
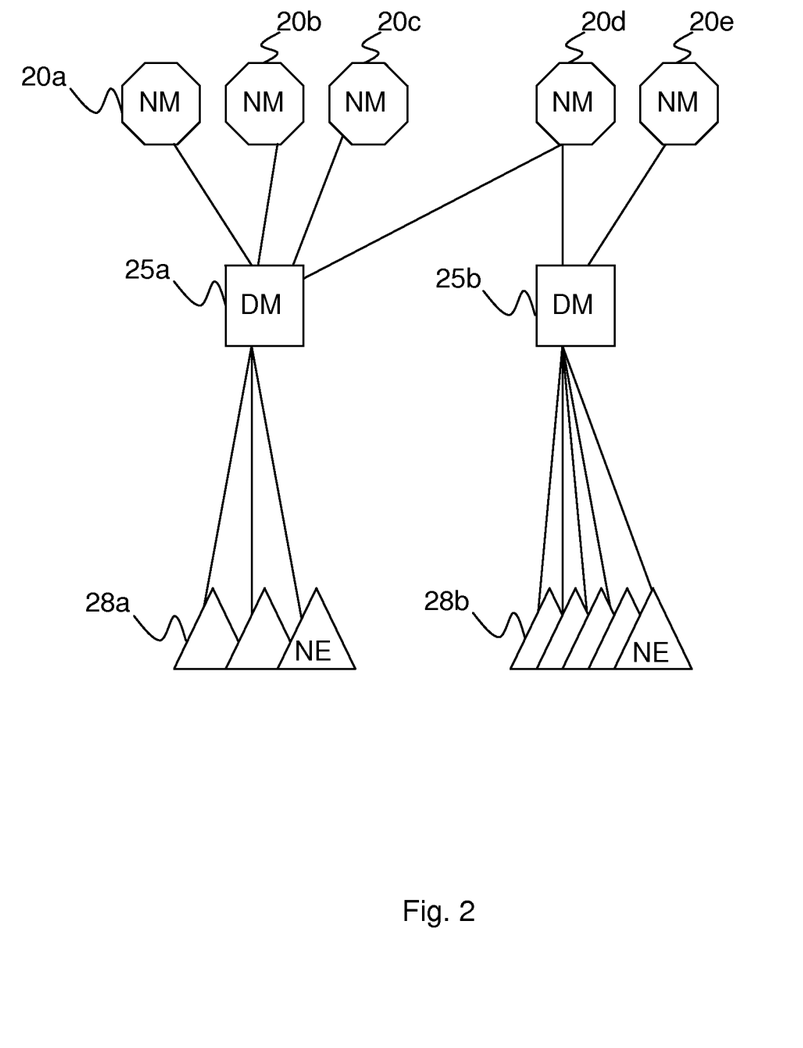
FIG. 2 shows an exemplary communication network management architecture.

With reference to FIG. 2, the network elements (NEs) generate alarms and these are collected by their respective domain managers (DMs). The network managers (NMs) collect the alarms from several DMs. Each DM may collect alarms from several thousands of NEs. Given that each NE may generate hundreds or thousands of alarms per day, there is a large propagation of data from NE upwards. The information contained in the alarms at NE level is used to identify the faulty equipment or function, and to identify the appropriate remedial actions to be taken by an operator to correct the fault condition. This information is used by systems or operators at the NE and DM level, and occasionally at the NM level.

Today, there exists an operation in the 3GPP Alarm IRP to request summary information for all or part of the network being managed by an Alarm IRP Agent, namely the operation getAlarmCount( ) 3GPP2 has defined a similar function.

There also exists an operation in the 3GPP Alarm IRP to request all the current detailed alarm information for all or part of the network being managed by an Alarm IRP Agent, namely getAlarmList( ). 3GPP2 has defined a similar function.

There further exists an operation in the 3GPP Notification IRP to request all new and changed alarm information for all or part of the network being managed by an Alarm IRP Agent, namely subscribe( ). 3GPP2 has defined a similar function. Similar notification exists in ITU-T Recommendation, ITU-T X.734 Recommendation on Event Report Management Function.

This prior-art paradigm of today of transporting alarm information has limitations and problems.

The prior-art paradigm uses the "publish-subscribe" paradigm. ER "publishes" the detail information regardless whether there are subscribers wanting it or not. Subscribers subscribe for reception of the information. The transfer of detailed information always happens, filling up the channel, regardless if there are any subscribers wanting it or not. Two problems exist. Firstly, the channel capacity may be used up for no reason, i.e. no subscribers wanting the information. Secondly, in the case a subscriber does not want the information, the subscriber process needs to filter/discard the information or the ER, reporting to the subject subscriber, needs to filter/discard the information. Thus, subscriber CPU or ER CPU cycles are wasted.

At each aggregation point, additional network load is incurred to send the detailed alarm information to the next level in the information-flow chain or hierarchy. For example, the communication channel capacity between the "higher level" and "lower level" is used for transporting alarms in competition with other needs such as transporting configuration management related data and performance management related data. Detailed alarm information is not always required, and summary information is often sufficient.

At each aggregation point, for example at DM, additional database/memory load is incurred to store the detailed alarm information. Large database/memory means longer time, for example, for the user of DM to search and retrieve relevant alarm data when wanted. Detailed alarm information is not always required, and summary information is often sufficient.

There is today no method to subscribe to summary alarm information from all or part of the network being managed by a DM.

With growing networks sizes and network and network element complexity, it is increasingly difficult to maintain detailed network alarm information at one level so that it is in sync and in real time with alarm information at a lower level.

Even if one has solved the synchronization problem mentioned above with acceptable level of reliability and performance, to maintain detailed network alarm information at DM in real time for the purpose of "just in case a DM user needs the information" is an expensive proposition, and is contrary to "just-in-time-inventory concept". Its implementation will use up critical DM-NE channel capacity that is shared for transportation of other types of information such as configuration management and performance management information.

Some NE's are actively carrying traffic in the network, while others are in the process of being commissioned or de-commissioned. For the NE's whose role is less critical in the network, and which may not be fully configured, it may not be relevant for the DM to receive and store all detailed alarm information. However, a summary of the alarm situation may be required, such that if a large change in the alarm volume occurs, or if some alarms of high severity occur, management intervention by the DM may still be required.

The communication facilities used between a) NMs and DMs and b) DMs and NEs may be shared, not dedicated resources. It is uneconomical to dimension a communication facility that can handle alarm storms, or peak alarm rate, since such facilities will not be filled to capacity at all times. A summary of alarm situation would reduce the potentially large volume of alarm notification emissions so that network operator needs not dimension its communication facility to handle peak alarm rate.

The communication facilities used between a) NMs and DMs and b) DMs and NEs may be provided by Internet, i.e. a public facility and one that is not dedicated for use by the operators of NMs, DMs and NEs. This is the case of when the NEs are home devices such as 3GPP Home eNB, TV set-top boxes, etc. It is virtually impossible to dimension that communication facility to handle alarm storms, or peak alarm rate. A summary of alarm situation would reduce the potentially large volume of alarm notification emissions so that network operator may avoid this dimensioning problem.

Also, equal priority is given to major and minor alarm raising, and also equal priority between alarm ceasing and raising, such that in a period of high alarm volume, the true nature of the alarm status may take some time to report, receive, and process the aforementioned 20 parameters of an alarm. Summary information can describe in one notification what might otherwise take hundreds of notifications.

Thus, there is a need for an improved method and arrangement for conveying network event information such as network alarm management information, of a large communication network, which overcome at least some of the problems and drawbacks mentioned above.

SUMMARY

Accordingly, one objective of the present invention is to provide a method and an arrangement of distributing fault information from a lower level network management node to a higher level network management node in a network management architecture comprising modules logically representing network nodes and network links under management.

According to a first aspect of embodiments of the present invention this objective is achieved through a method in which fault information is distributed from a lower level network management node to a higher level network management node. The method comprises the steps of: subscribing to at least some detailed fault information; receiving a notification comprising a summary of fault information sent by the lower level network management node; and, retrieving said subscribed detailed fault information from said received notification.

According to a second aspect of embodiments of the present invention this objective is achieved through an arrangement in which fault information is distributed from a lower level network management node to a higher level network management node. The arrangement comprises: a receiving unit for receiving a notification comprising a summary of fault information sent by the lower level network management node; and, a processing unit for subscribing to at least some detailed fault information and for retrieving said subscribed detailed fault information from said received notification.

Further embodiments are listed in the dependent claims.

Thanks to the provision of a method and arrangement, which allow a higher level network management node to get fault summary information from a lower level network management node, without the overhead of subscribing to all the detailed fault information, unnecessary transmission of fault events to higher level management systems is eliminated and, thereby, reducing network bandwidth required between these management nodes. Based on the summary information retrieved, the higher level manager may subscribe to some or all of the detailed fault information. Further, the database load caused by receiving unnecessary fault events in a higher level management system is reduced.

And also, the CPU load on a lower level management system, by reducing the number of detailed fault events that need to be transmitted to higher level management systems is reduced. The same applies to the NE, it may report summary to the DM, and this might be especially useful in the home equipment category.

The creation of simple surveillance applications which use the summary alarm information to present the numbers of critical, major, minor, alarms etc on a particular manager object is enabled. Based on the numbers in the summary, additional detailed information may be sought using existing mechanisms, if required.

The embodiments of the present invention do not require a new architecture. The publish/subscribe paradigm is used but it is used for transferring summary data instead of data. Based on this summary data, more information may be requested using existing methods.

Still other objects and features of embodiments of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For a better understanding, reference is made to the following drawings and preferred embodiments of the invention. In the drawings, wherein like reference characters denote similar elements throughout the several views.

DETAILED DESCRIPTION

Figure 1:
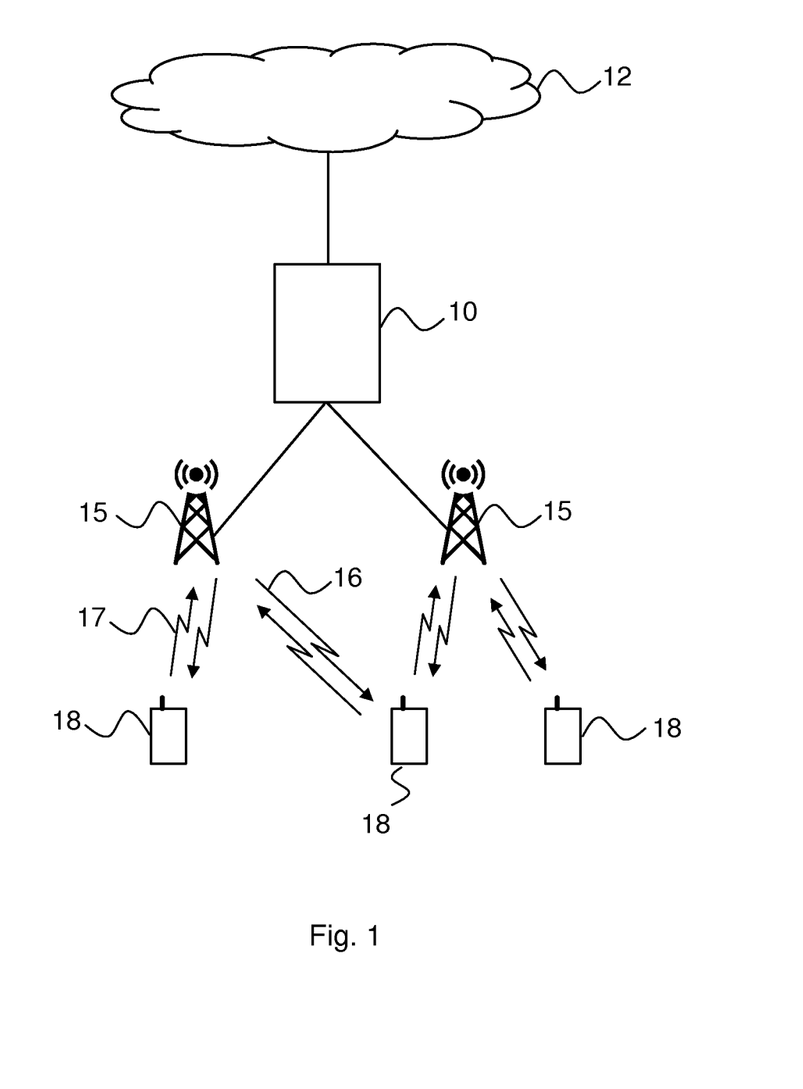
FIG. 1 shows an exemplary communication network architecture.

FIG. 1 depicts a communication network system including a Radio Access Network (RAN), such as the UMTS Terrestrial Radio Access Network (UTRAN) architecture, comprising at least one Radio Base Station (RBS) (or Node B) 15 (two are shown in FIG. 1) connected to one or more Radio Network Controllers (RNCs) 10. The RAN is connected to a Core network (CN) 12. The RAN and the CN 12 provide communication and control for a plurality of user equipments (UE) 18 that each uses downlink (DL) channels 16 and uplink (UL) channels 17. For the reason of clarity, only one uplink channel is denoted 17 and one downlink channel denoted 16. On the downlink channel 16, the RBS 15 transmits to each user equipment 18 at respective power level. On the uplink channel 17, the user equipments 18 transmit data to the RBS 15 at respective power level.

The communication system further comprises a network management architecture, shown in FIG. 2, comprising nodes responsible of managing the network. These nodes install, configure and supervise the nodes and links of the communication system shown in FIG. 1.

FIG. 2 shows the network management architecture. It comprises nodes and links under management such as network elements (NEs) 28a and 28b, which are nodes in the communication network system, such as the RNC 10 and the radio base stations 15 shown in FIG. 1. The management network further comprises domain managers (DMs) e.g. 25a and 25b, each of which manages/supervises some NEs. A number of network managers (NMs) 20a-20e form a higher level of management applications. The communication channels (depicted by lines between NEs and DMs) are used to support communication between DMs and their managed NEs. The communication channels, depicted by lines between NMs and DMs, are used to support communication between NMs and DMs. In 3GPP/3GPP2 this standardized interface is called Interface-N. In ITU-T this interface is called the TMN interface.

Figure 3:
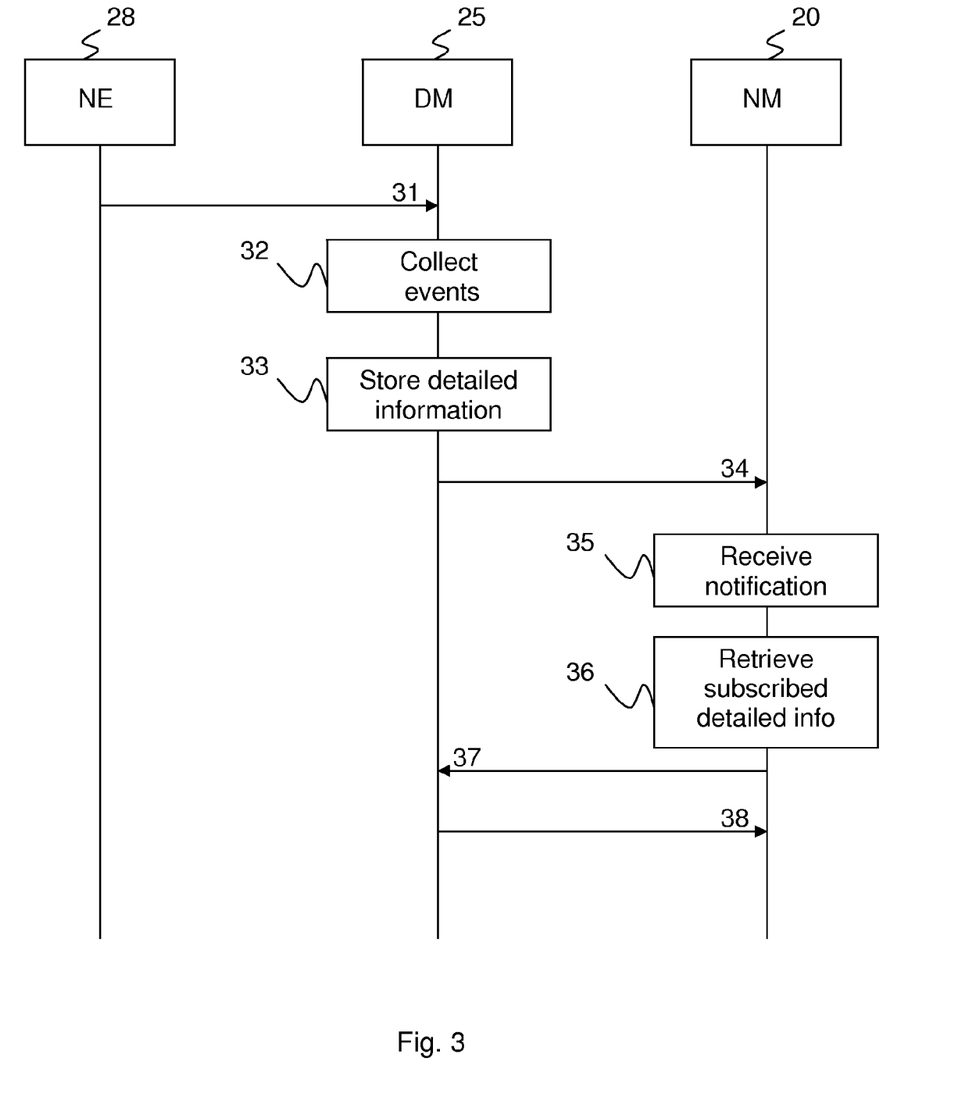
FIG. 3 is a signalling diagram showing embodiments of the present invention.

According to embodiments of the present invention a procedure for distributing fault information from a lower level network management node to a higher level network management node in a network management architecture comprising modules logically representing network nodes and network links under management, is provided, illustrated in the signalling diagram of FIG. 3.

In FIG. 3, the NEs 28 are event reporters (ERs) reporting faults of the NEs as alarm notifications to the DM 25 which is an event collector (EC), illustrated with arrow 31. The DM 25 collects these reported events (step 32) and stores detailed information received in the alarm notifications (step 33). The DM 25 then sends a summary of received fault information to the NM 20 illustrated with arrow 34 and the NM 20 receives this fault notification (step 35). The NM 20 then determines to subscribe to detailed fault information from the received summary fault information (step 36) and sends the subscription to the DM 25 illustrated with arrow 37, whereby the DM 25 sends this detailed information back to the NM 20 at arrow 38.

Thus, according to embodiments of the invention, a higher level network management node, such as the NM, gets fault summary information from a lower level network management node, such as the DM, without the overhead of subscribing to all the detailed fault information. Accordingly, definitions and use of new notifications are provided:

1) The definition and the use of a new notification called notifyAlarmCount(parameters . . . ). The parameters of this new notification contain a summary of alarm information at the time of notification. Types of information carried in this notification includes the identifier of the issuer of the notification, the time of notification, the count of alarms and the total count of alarms. A more detailed definition is found below.

2) The definition and the use of a new notification subscription operation in that the NM may subscribe to receive notification carrying summary alarm information from one or more managed object classes, or one or more managed object instances. For example, when NM subscribes for "all", the notifyAlarmCount(parameters . . . ) will carry alarm information of all managed nodes. When NM subscribes for a section of a network (e.g. a subtree of managed NEs), then the notifyAlarmCount (parameters . . . ) will carry alarm information of all instances of that section of network only. A more detail definition of this subscription operation is found below.

notifyAlarmCount Notification

A DM knows all the existing alarms of its managed NEs. The managed NEs have Distinguished Names (DNs) defined in 3GPP TS 32.300: "Telecommunication management; Configuration Management (CM); Name convention for Managed Objects". The DN name space is organised in a naming hierarchy not unlike the international telephone numbering scheme. The managed NEs are therefore, by virtue of their DNs, logically organized in a hierarchy.

This notification carries counts of alarms of its managed NEs of a particular part of the naming hierarchy. The whole naming hierarchy is sometimes called the naming-tree (or tree). A part of the naming hierarchy is called a sub-tree here in this document.

DM uses this notification to notify NM about the alarm count.

| Parameter Name | Qualification | Comment |
| --- | --- | --- |
| notificationId | Mandatory | The identifier of this notification |
| eventTime | Mandatory | The time this notification is constructed |
| systemDN | Mandatory | The identifier of the DM |
| notificationType | Mandatory | It indicates that this notification is of type notifyAlarmCount |
| sessionId | Mandatory, filterable | It identifies the subscription session |
| counterSet | Mandatory | It carries a set of Counters. Each Counter is:<br>{<br>    baseObject identifying the base of a subtree;<br>    count for critical alarms;<br>    count for major alarms;<br>    count of minor alarms;<br>    count for warning alarms;<br>    count of indeterminate alarms;<br>    count of cleared alarms;<br>} |

The subscribeNotifyAlarmCount Operation

NM uses this operation to subscribe for the reception of notifyAlarmCount notifications. The parameter of the subscribe operation is listed in the table below.

DM will respond with a sessionID if the subscription is successful. The parameter of the unsubscribe operation has one parameter, the sessionID.

| Parameter Name | Qualifier | Comment |
|---|---|---|
| managerReference | M | It specifies the NM requesting a subscription. |
| baseObjectList | M | It specifies a list of Distinguished Names (DN). Each DN identifies the base of a subtree of managed NEs |
| trigger | M | It specifies the trigger of notifyAlarmCount. The trigger can be frequency based (e.g. issue notification once every 5 minutes) or it can be counter base (e.g. 2 more critical alarms reported by NEs or 10 general alarms reported by NE). |

The unsubscribeNotifyAlarmCount Operation

NM uses this operation to unsubscribe for the reception of notifyAlarmCount notifications. The parameter of the subscribe operation is listed in the table below.

DM will respond with the success or failure.

| Parameter Name | Qualifier | Comment |
|---|---|---|
| sessionID | M | It specifies the identify of the subscription that is needed to be terminated (i.e. to be unsubscribed) |
| managerReference | M | It specifies the NM that have requested the subscription. |

Parameters in Detail Alarm Notification

Below is a table of parameters in detail alarm notification from 3GPP TS 32.111-2.

| Parameter Name |
|---|
| objectClass |
| objectInstance |
| notificationId |
| eventTime |
| systemDN |
| notificationType |
| probableCause |
| perceivedSeverity |
| alarmType |
| specificProblem |
| correlatedNotifications |
| backedUpStatus |
| backUpObject |
| trendIndication |
| thresholdInfo |
| stateChangeDefinition |
| monitoredAttributes |
| proposedRepairActions |
| additionalText |
| additionalInformation |
| alarmId |

Figure 4:
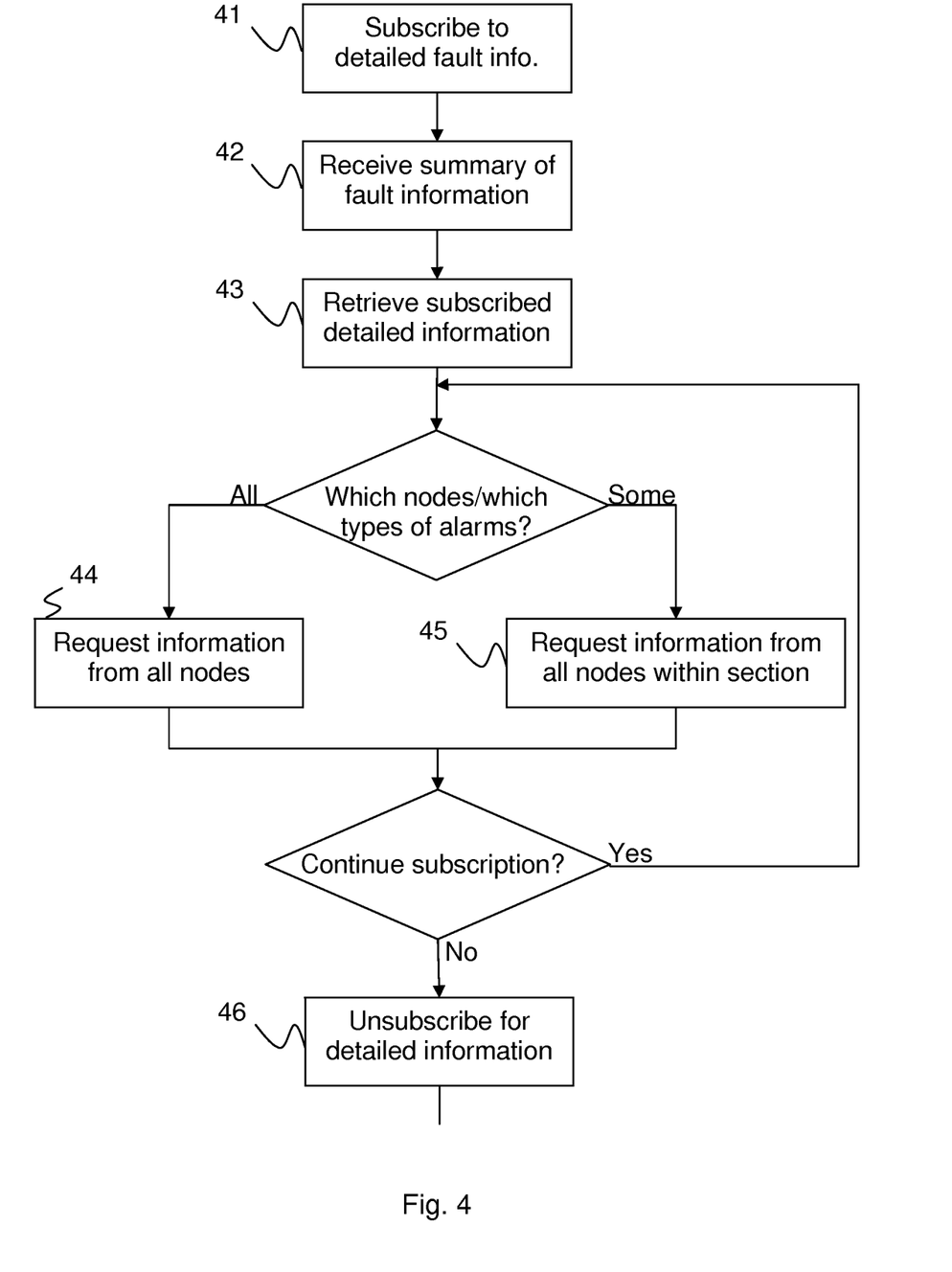
FIG. 4 is a flowchart showing the procedure according to embodiments of the invention.

According to general embodiments of the present invention, the method of distributing fault information from a lower level network management node to a higher level network management node in a network management architecture comprising modules logically representing network nodes and network links under management, as shown in FIG. 4, is as follows:

the higher level network management node, subscribing to at least some detailed fault information (step 41);

the higher level network management node, receiving a summary of fault information at a time of notification sent by the lower level network management node (step 42);

the higher level network management node, retrieving said subscribed detail fault information from said received summary fault information (step 43).

According to some embodiments, the method further comprises the step of requesting fault information from all network nodes under management (step 44).

According to some embodiments, the method further comprises the step of requesting fault information from all network nodes under management within a section of said network management architecture (step 45).

According to some embodiments, the type of information carried in said notification is at least one of the following: identifier of an issuer of said notification; a time of said notification; a number (count) of alarms; or, a total number (count) of alarms.

According to some embodiments, said notification is received with a pre-determined time interval.

According to some embodiments, said notification is received when a pre-determined number of alarms has been reported by said network nodes under management.

According to some embodiments, the method further comprises the step of unsubscribing for the reception of said notification (step 46).

Figure 5:
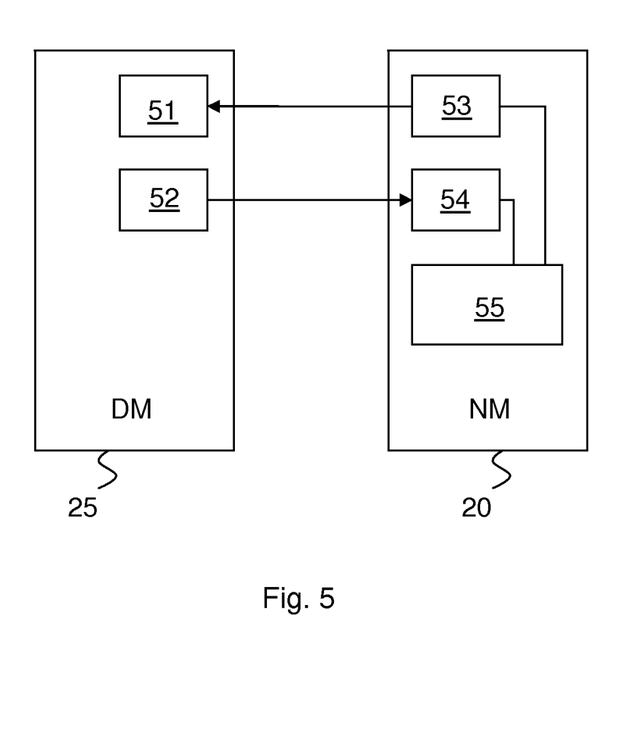
FIG. 5 is a block diagram of an arrangement according to embodiments of the invention.

FIG. 5 is a block diagram showing an arrangement in a lower level network management node, such as a domain manager 25, and a higher level network management node, such as a network manager 20 for distributing fault information from the lower level network management node 25 to the higher level network management node 20 in a network management architecture comprising modules logically representing network nodes and network links under management.

The DM 25 comprises a transmitting unit 52 and a receiving unit 51. The transmitting unit 52 is sending data to a receiving unit 54 of the NM 20. The receiving unit 51 is receiving data from a transmitting unit 53 of the NM 20.

The NM 20 comprises a transmitting unit 53 arranged to transmit data to the receiving unit 51 of the DM 25. The NM 20 also comprises a receiving unit 54 arranged to receive data transmitted from the transmitting unit 52 of the DM 25. The receiving unit 54 of the NM 20 is further arranged to receive a notification comprising a summary of fault information sent by the DM 25. The NM 20 further comprises a processing unit 55 arranged to subscribe to at least some detailed fault information and to retrieve the subscribed detailed fault information from said received notification.

According to some embodiments, said processing unit is arranged to request fault information from all network nodes under management.

According to some embodiments, said processing unit is arranged to request fault information from all network nodes under management within a section of said network management architecture.

According to some embodiments, the type of information carried in said notification is at least one of the following: identifier of an issuer of said notification; a time of said notification; a number (count) of alarms; or, a total number (count) of alarms.

According to some embodiments, said receiving unit of the NM is arranged to receive said notification with a pre-determined time interval.

According to some embodiments, said receiving unit of the NM is arranged to receive said notification when a pre-determined number of alarms has been reported by said network nodes under management.

According to some embodiments, said processing unit is arranged to unsubscribe for the reception of said notification.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim embodiments of the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of distributing fault information from one or more managed network nodes to a higher level network management node via an intermediary level network management node in a network management architecture comprising modules logically representing network nodes and network links under management, wherein said intermediary level network management node receives and stores alarms containing detailed fault information sent by said one or more managed network nodes, the method performed by the higher level network management node and comprising the steps of:
   receiving, at said higher level network management node, a notification comprising a summary of said detailed fault information sent by said one or more managed network nodes to said intermediary level network management node;
   subscribing, by said higher level network management node, to at least some detailed fault information based on said notification; and
   retrieving, by said higher level network management node, said subscribed detailed fault information from said intermediary level network management node.

2. The method according to claim 1, wherein the method further comprises the step of requesting said detailed fault information from all managed network nodes.

3. The method according to claim 1, wherein the method further comprises the step of requesting said detailed fault information from all managed network nodes within a section of said network management architecture.

4. The method according to claim 1, wherein the type of information carried in said notification is at least one of the following:
   an identifier of an issuer of said notification;
   a time of said notification;
   a number of alarms;
   or, a total number of alarms.

5. The method according to claim 1, wherein said notification is received with a pre-determined time interval.

6. The method according to claim 1, wherein said notification is received when a pre-determined number of alarms has been reported by said one or more managed network nodes.

7. The method according to claim 1, wherein the method further comprises the step of unsubscribing for reception of said at least some detailed fault information.

8. A higher level network management node configured to receive distributed fault information from one or more managed network nodes via an intermediary level network management node in a network management architecture comprising modules logically representing network nodes and network links under management, wherein said intermediary level network management node receives and stores alarms containing detailed fault information sent by said one or more managed network nodes, the higher level network management node comprising:
   a receiver configured to receive a notification comprising a summary of said detailed fault information sent said one or more managed network nodes to said intermediary level network management node; and
   a processor configured to subscribe to at least some detailed fault information based on said notification;
   the processor further configured to retrieve said at least some detailed fault information from said intermediary level network management node.

9. The higher level network management node according to claim 8, wherein said processor is further configured to request fault information from all of said managed network nodes.

10. The higher level network management node according to claim 8, wherein said processor is further configured to request fault information from all of said managed network nodes within a section of said network management architecture.

11. The higher level network management node according to claim 8, wherein the type of information carried in said notification is at least one of the following:
   an identifier of an issuer of said notification;
   a time of said notification;
   a number of alarms; or,
   a total number of alarms.

12. The higher level network management node according to claim 8, wherein said processor is further configured to receive said notification with a pre-determined time interval.

13. The higher level network management node according to claim 8, wherein said receiver is further configured to receive said notification when a pre-determined number of alarms has been reported by said one or more managed network nodes.

14. The higher level network management node according to claim 8, wherein said processor is further configured to unsubscribe for reception of said at least some detailed fault information.

* * * * *